(12) United States Patent
Hiyama

(10) Patent No.: US 11,235,407 B2
(45) Date of Patent: Feb. 1, 2022

(54) SOLDERING APPARATUS AND METHOD OF FIXING GASKET TO THE SOLDERING APPARATUS

(71) Applicant: SENJU METAL INDUSTRY CO., LTD., Tokyo (JP)

(72) Inventor: Tsutomu Hiyama, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/788,738

(22) Filed: Feb. 12, 2020

(65) Prior Publication Data

US 2020/0269337 A1 Aug. 27, 2020

(30) Foreign Application Priority Data

Feb. 26, 2019 (JP) .............................. JP2019-032343

(51) Int. Cl.
*B23K 3/08* (2006.01)
*F16B 19/10* (2006.01)

(52) U.S. Cl.
CPC .............. *B23K 3/08* (2013.01); *F16B 19/109* (2013.01)

(58) Field of Classification Search
CPC .......... F16J 15/02; F16J 15/0818; F16J 3/042; F16J 15/022; F16J 15/061; F16J 15/104; B23K 3/08; F16B 19/109; B60J 10/27; B60J 10/30
See application file for complete search history.

(56) References Cited

U.S. PATENT DOCUMENTS

| | | | | | |
|---|---|---|---|---|---|
| 2,058,010 | A | * | 10/1936 | Fitch | F16J 15/02 277/649 |
| 2,705,655 | A | * | 4/1955 | Flemming | B60J 10/246 277/645 |
| 4,364,595 | A | * | 12/1982 | Morgan | B60J 1/10 296/146.15 |
| 4,963,696 | A | * | 10/1990 | Owen | H01F 27/02 174/50 |
| 5,391,333 | A | * | 2/1995 | Stecher | B21H 8/00 264/220 |

(Continued)

FOREIGN PATENT DOCUMENTS

DE 4219761 A1 12/1993
DE 102014103591 A1 9/2015
(Continued)

OTHER PUBLICATIONS

Decision to Grant a Patent in counterpart Japanese Patent Application No. 2019-032343, dated May 27, 2019, with English translation.

(Continued)

*Primary Examiner* — Eugene G Byrd
(74) *Attorney, Agent, or Firm* — Harness, Dickey & Pierce, P.L.C.

(57) ABSTRACT

Provided are a soldering apparatus that allows a gasket to be easily attached to and detached from the soldering apparatus, and a method of fixing the gasket to the soldering apparatus. The soldering apparatus includes: a furnace body; a gasket that is provided to at least a part of the furnace body, and that seals the furnace body; and a push rivet that fixes the gasket in an attachable/detachable manner to the furnace body.

15 Claims, 5 Drawing Sheets

(56) References Cited

U.S. PATENT DOCUMENTS

| | | | | |
|---|---|---|---|---|
| 5,544,458 | A * | 8/1996 | Fisher | B29C 45/14434 |
| | | | | 156/245 |
| 7,241,246 | B2 * | 7/2007 | Beutler | B03C 1/286 |
| | | | | 475/230 |
| 9,912,095 | B2 * | 3/2018 | Beischer | H01R 13/5202 |
| 9,920,827 | B1 * | 3/2018 | Sieferd | F16H 57/037 |
| 2005/0212219 | A1 * | 9/2005 | Langenbach | F16J 15/0818 |
| | | | | 277/592 |
| 2006/0267293 | A1 * | 11/2006 | Hazel | F16J 15/102 |
| | | | | 277/637 |
| 2008/0067760 | A1 * | 3/2008 | Kikuchi | F16J 15/061 |
| | | | | 277/649 |
| 2010/0143076 | A1 * | 6/2010 | Matsumoto | F16J 15/104 |
| | | | | 411/533 |
| 2012/0153579 | A1 * | 6/2012 | Nakaoka | F16J 15/0818 |
| | | | | 277/644 |
| 2013/0009365 | A1 * | 1/2013 | Kabutoya | B32B 27/18 |
| | | | | 277/312 |
| 2013/0249173 | A1 * | 9/2013 | Yamamoto | F16J 15/024 |
| | | | | 277/639 |
| 2014/0197606 | A1 * | 7/2014 | Jeanne | F16J 15/106 |
| | | | | 277/644 |
| 2016/0053795 | A1 | 2/2016 | Goldberg | |
| 2017/0227127 | A1 * | 8/2017 | Watanabe | F16J 15/10 |
| 2018/0003300 | A1 * | 1/2018 | Watanabe | F16J 15/0887 |
| 2019/0024796 | A1 * | 1/2019 | Amano | F16J 15/127 |
| 2019/0053394 | A1 * | 2/2019 | Suwa | H05K 7/14 |
| 2019/0162305 | A1 * | 5/2019 | Uemura | F16J 15/02 |

FOREIGN PATENT DOCUMENTS

| | | |
|---|---|---|
| EP | 2650572 A1 | 10/2013 |
| EP | 2657545 A1 | 10/2013 |
| FR | 2747172 A1 | 10/1997 |
| JP | S60-145612 U | 9/1985 |
| JP | H02-080209 U | 6/1990 |
| JP | H05-073496 U | 10/1993 |
| JP | H06-085450 A | 3/1994 |
| JP | 2001-015905 A | 1/2001 |
| JP | 2011-079055 A | 4/2011 |
| JP | 2015-230103 A | 12/2015 |
| JP | 2016-089881 A | 5/2016 |

OTHER PUBLICATIONS

Extended European Search Report in corresponding European patent application No. 20156955.5 dated Aug. 3, 2020.

* cited by examiner

SOLDERING APPARATUS AND METHOD OF FIXING GASKET TO THE SOLDERING APPARATUS

CROSS-REFERENCE TO RELATED APPLICATION

This application is based upon and claims benefit of priority from Japanese Patent Application No. 2019-032343 filed on Feb. 26, 2019, the entire contents of which are incorporated herein by reference.

TECHNICAL FIELD

The present invention relates to a soldering apparatus and a method of fixing a gasket to the soldering apparatus.

DESCRIPTION OF RELATED ART

A reflow apparatus has been known as an example of an apparatus that solders electronic components to a printed circuit board. In the reflow apparatus, for ease of maintenance, a structure in which a housing of an upper furnace body is superimposed in a separable manner on a lower furnace body has been employed. A superimposed part of the furnace bodies is sealed with a gasket such that in-furnace air is prevented from leaking to the outside. By preventing the in-furnace air from leaking to the outside, in-furnace heating efficiency can be maintained. In addition, $N_2$ reflow apparatuses including furnaces in which an $N_2$ atmosphere is maintained for increasing soldering efficiency also have been used. Also in the $N_2$ reflow apparatuses, the $N_2$ atmosphere in the furnace can be maintained by preventing the in-furnace air from leaking to the outside. As an example of such reflow apparatuses including the gaskets, an apparatus disclosed in Japanese Patent Application Laid-open No. 2001-15905 has been known.

BRIEF SUMMARY OF INVENTION

In the reflow apparatus, boards to which solder paste has been printed in advance are transported into and then heated in a reflow furnace of the reflow apparatus. The gasket that prevents the in-furnace air from leaking to the outside is deteriorated along with heating of the in-furnace air. In addition, when the boards are heated, flux contained in the solder paste is vaporized into flux fumes to waft in the reflow furnace. Adhesion of these flux fumes to the gasket causes corrosion of the gasket. The gasket having been deteriorated by the heat or corroded by the adhesion of the flux fumes in such ways needs to be replaced. According to Japanese Patent Application Laid-open No. 2001-15905, the reflow apparatus including the upper and lower divided housings that are unlikely to cause the deterioration of the gasket is provided. However, as indicated by the phrase "unlikely to cause the deterioration," it is impossible to completely prevent the deterioration itself of the gasket.

In addition, as an example of soldering apparatuses other than the reflow apparatus, there may be mentioned a jet soldering apparatus including a jet solder bath. In this jet soldering apparatus, boards to which flux has been applied in advance are heated during a process of being transported to the jet solder bath, and then soldered with molten solder that is jetted in the jet solder bath. In the heating of the board and the soldering in the jet solder bath, the flux is vaporized into the flux fumes. As a countermeasure, also in the jet soldering apparatus, the gasket that prevents the in-furnace air and the flux fumes from leaking to the outside of the apparatus is provided as in the reflow apparatus. In such ways, the soldering apparatuses generally include the sealing gaskets that mainly prevent the in-furnace air from leaking to the outside of the apparatuses, and the gaskets deteriorated by the heat need to be periodically replaced.

In the furnace bodies of the related-art soldering apparatuses, bonds or screws have been used for fixing the gaskets. However, when the screws are used, the soldering apparatuses may have structures in which spaces that allow an operator to perform a screwing operation are small, and hence the screwing operation is difficult. As a result, there has been a problem that attachment and replacement of the gaskets require time and effort.

Meanwhile, when the bonds are used, it takes, for example, one day until the bonds are dried after the gaskets are bonded to the furnace bodies with the bonds. In this way, it takes time to fix the gaskets. Thus, there has been another problem that efficiency of the attachment of the gaskets with the bonds is low.

In addition, as described above, the gaskets to be attached to the furnace bodies are deteriorated by the heating, or corroded by the adhesion of the flux fumes to the surfaces of the gaskets, and hence need to be periodically replaced. However, the operations to detach the gaskets attached with use of the bonds or the screws take time, and hence there is still another problem that maintainability is low.

The present invention has been made to solve the problems as described above, and an object thereof is to provide a soldering apparatus that allows a gasket to be easily attached to and detached from the soldering apparatus, and to provide a method of fixing the gasket to the soldering apparatus.

According an aspect, there is provided a soldering apparatus. This soldering apparatus includes:
a furnace body;
a gasket
that is provided to at least a part of the furnace body, and that seals the furnace body; and
a push rivet that fixes the gasket in an attachable/detachable manner to the furnace body.

According to another aspect, there is provided a method of fixing a gasket to a soldering apparatus. This method includes:
arranging the gasket in a furnace body of the soldering apparatus; and
fixing the gasket in an attachable/detachable manner to the furnace body with use of a push rivet.

DETAILED DESCRIPTION OF INVENTION

Figure 1:
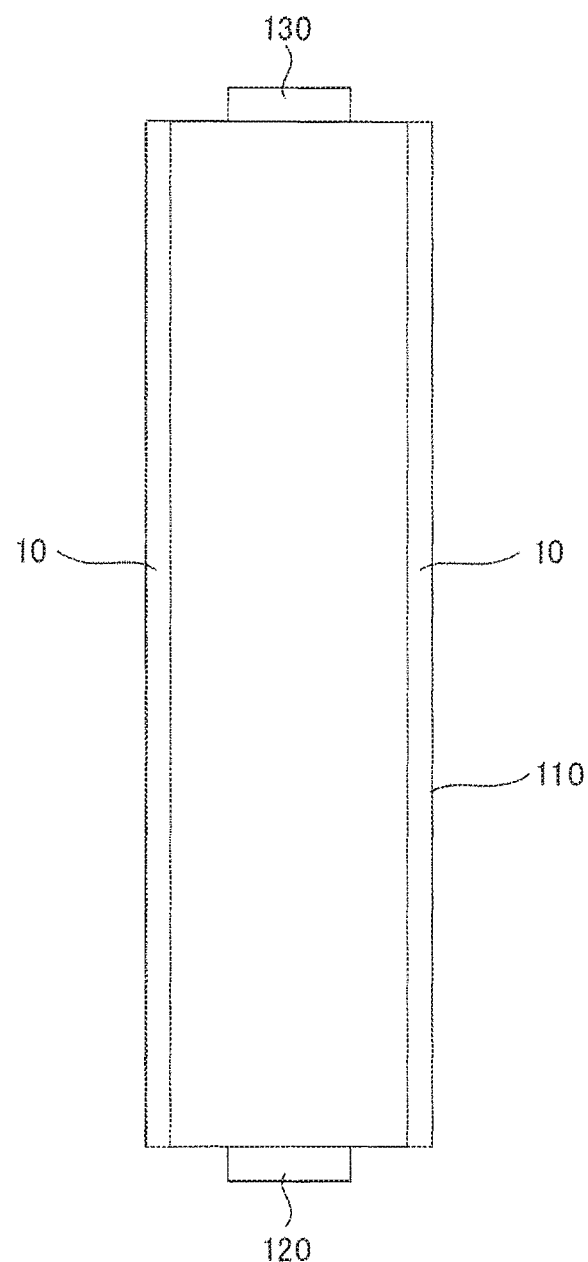
FIG. 1 is a schematic top view of a reflow apparatus according to an embodiment of the present invention.

Now, an embodiment of the present invention is described with reference to the drawings. In the drawings described below, the same or corresponding components are denoted by the same reference symbols to omit redundant description thereof. Note that, although a reflow apparatus is described as an example of a soldering apparatus of the present invention in the embodiment described below, the soldering apparatus is not limited thereto, and any soldering apparatus in which the gaskets are used as described above can be encompassed within the scope of the present invention.

Figure 2:
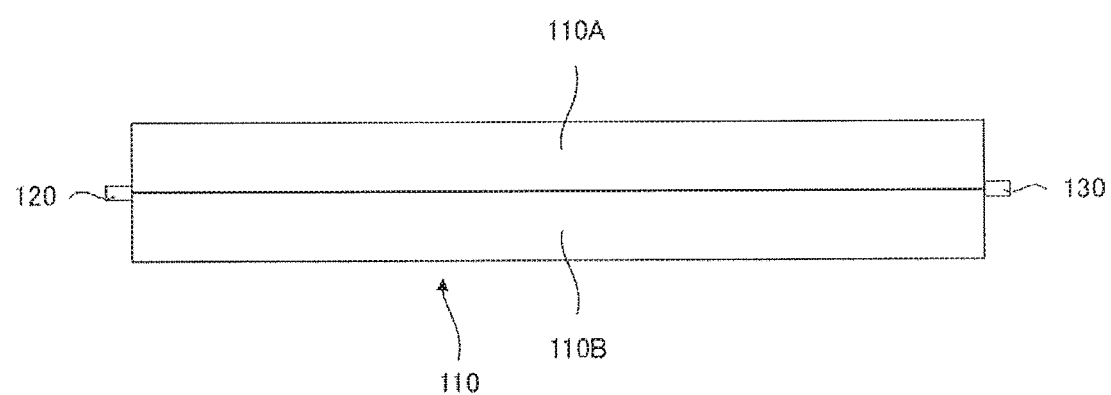
FIG. 2 is a schematic side view of the reflow apparatus according to the embodiment of the present invention.

FIG. 1 is a schematic top view of a reflow apparatus according to this embodiment. FIG. 2 is a schematic side view of the reflow apparatus according to this embodiment. As illustrated in FIG. 1 and FIG. 2, this reflow apparatus 100 includes a furnace body 110, a carry-in port 120, and a carry-out port 130. The carry-in port 120 is an inlet for allowing a board to which solder paste has been applied (not shown) to be carried into the furnace body 110. The carry-out port 130 is an outlet for allowing the heated board (not shown) to be carried out of the furnace body 110. The reflow apparatus 100 according to this embodiment need not necessarily include the single carry-in port 120 and the single carry-out port 130, and may, for example, include two or more carry-in ports 120 and carry-out ports 130 in equal numbers such that the number of boards to be processed at the same time is increased.

The reflow apparatus 100 includes a transport conveyor (not shown) for transporting the boards, which have been fed through the carry-in port 120, to the carry-out port 130. The furnace body 110 includes therein a configuration that heats, from above and below, the boards having been carried in through the carry-in port 120, and then cools the heated boards. Specifically, for example, the furnace body 110 includes therein a plurality of heating zones and at least one cooling zone arranged in line. The boards that have been carried in through the carry-in port 120 are transported toward the carry-out port 130 at a predetermined speed. The boards are preliminarily heated at a preliminary heating portion in one of the heating zones, and then heated to a predetermined temperature at a main heating portion in another one of the heating zones. During these processes, the solder paste on the boards is molten, and flux fumes are generated at the time when the solder paste is molten. In the cooling zone, the boards are rapidly cooled to solidify the solder.

As illustrated in FIG. 2, the furnace body 110 includes an upper furnace body 110A and a lower furnace body 110B. The upper furnace body 110A and the lower furnace body 110B are coupled to each other with, for example, hinges, and the upper furnace body 110A is configured to be openable/closable on its one side relative to the lower furnace body 110B such that internal maintenance and the like can be performed. In this embodiment, in order that in-furnace air is prevented from leaking through a superimposition plane between the upper furnace body 110A and the lower furnace body 110B, as illustrated in FIG. 1, a gasket 10 is provided to at least one of the upper furnace body 110A and the lower furnace body 110B. The gasket 10 may be formed of an arbitrary sealing material such as a silicone sponge. Specifically, in this embodiment, along a direction in which the carry-in port 120 and the carry-out port 130 are connected to each other (transport direction of the boards), the gasket 10 is provided along both edges of opening portions of the lower furnace body 110B. This prevents the in-furnace air from leaking under a state in which the upper furnace body 110A and the lower furnace body 110B are closed to each other. Thus, during the process of heating the boards, the flux fumes generated in the furnace body 110 also can be suppressed from flowing to an outside of the furnace body 110. Note that, the gasket 10 may be provided to the upper furnace body 110A.

Hitherto, as described above, the gasket 10 to be used in the furnace body 110 has been fixed to the furnace body 110 with a bond or screws. Specifically, when the gasket 10 is fixed with the screws to the furnace body 110 in which the upper furnace body 110A is opened and closed on its one side relative to the lower furnace body 110B as in this embodiment, an operation to fix a side of the gasket 10, which is closer to the hinges, with the screws is difficult because a space for this operation is small. Meanwhile, when the gasket 10 is bonded with the bond, it has been impossible to immediately perform a replacement operation or the like of the gasket 10 because it takes a long time period (for example, one day) until the bond that bonds the gasket 10 to the furnace body 110 is dried.

Figure 3:
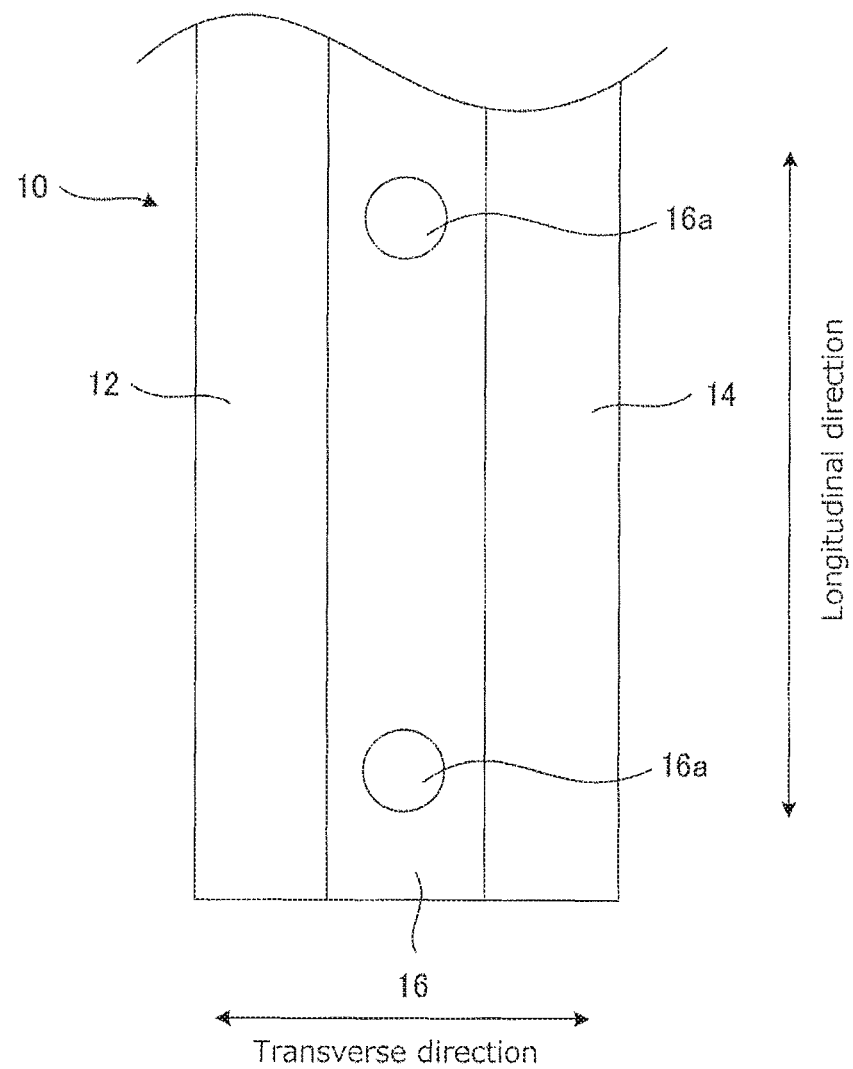
FIG. 3 is a top view of a gasket according to the embodiment of the present invention.
Figure 4:
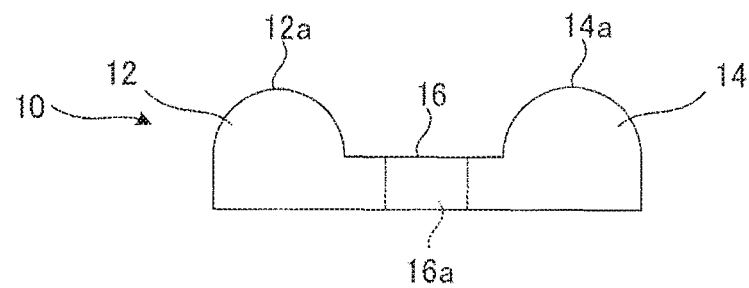
FIG. 4 is a side view the gasket according to the embodiment of the present invention.

In view of such circumstances, in the reflow apparatus 100 according to this embodiment, the gasket 10 is fixed with push rivets. FIG. 3 is a top view of the gasket 10 according to this embodiment. FIG. 4 is a side view in which the gasket 10 according to this embodiment is viewed in its longitudinal direction. As illustrated in FIG. 3 and FIG. 4, the gasket 10 according to this embodiment includes a first sealing portion 12, a second sealing portion 14, and a fixation portion 16. As illustrated in FIG. 4, the first sealing portion 12 and the second sealing portion 14 respectively include a first sealing surface 12a and a second sealing surface 14b to be held in contact with the upper furnace body 110A. As illustrated in FIG. 4, in this embodiment, the first sealing surface 12a and the second sealing surface 14b each have a semi-circular shape in cross-section. Alternatively, the first sealing surface 12a and the second sealing surface 14b may each have an arbitrary protruding shape.

Although the first sealing portion 12 and the second sealing portion 14 may have thicknesses and shapes different from each other, as illustrated in FIG. 4, in this embodiment, the first sealing portion 12 and the second sealing portion 14 each have substantially the same thickness and substantially the same shape. This enables substantially-uniform pressure application to the first sealing portion 12 and the second sealing portion 14 under the state in which the furnace body 110 is closed. As a result, degrees of deterioration of the first sealing portion 12 and the second sealing portion 14 can be further equalized to each other.

The fixation portion 16 is a plate-like part to be coupled to the first sealing portion 12 and the second sealing portion 14. In other words, the fixation portion 16 has a function to couple the first sealing portion 12 and the second sealing portion 14 integrally to each other. The fixation portion 16 is located between the first sealing portion 12 and the second sealing portion 14, and extends in the same direction as a direction in which the first sealing portion 12 and the second sealing portion 14 extend. As illustrated in FIG. 3, the fixation portion 16 has a plurality of through-holes 16a. As described below, by inserting the push rivets into the through-holes 16a, the gasket 10 can be fixed in an attachable/detachable manner to the furnace body 110.

Further, as illustrated in FIG. 4, the fixation portion 16 is thinner than each of the first sealing portion 12 and the second sealing portion 14. This configuration prevents the push rivets arranged in the fixation portion 16 from protruding higher than the first sealing portion 12 and the second sealing portion 14 under the state in which the furnace body 110 is closed. In this way, this configuration does not physically affect the sealing of the furnace body 110.

Figure 5A:
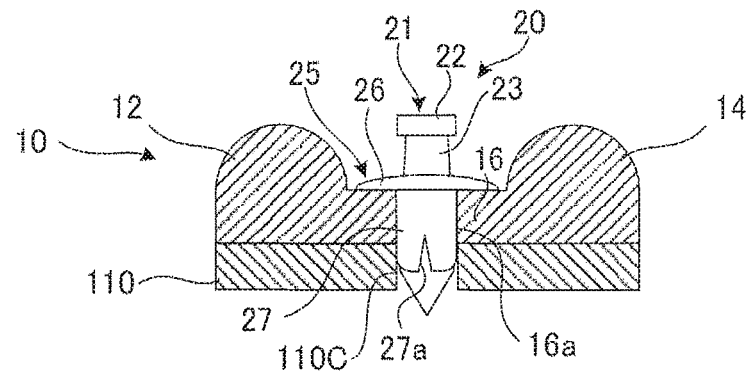
FIG. 5A is a view illustrating a procedure for attaching the gasket with use of push rivets.
Figure 5B:
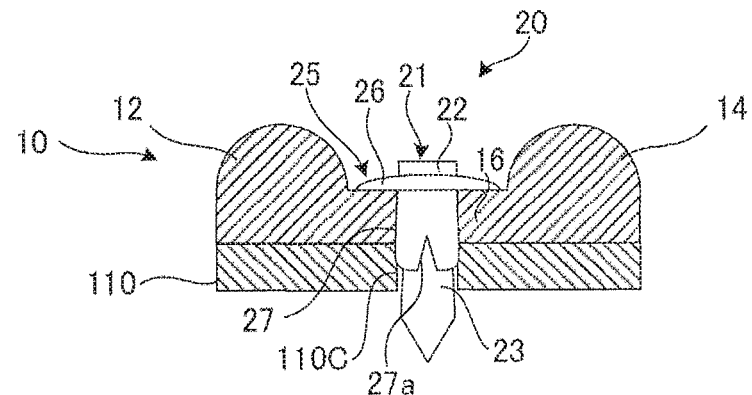
FIG. 5B is another view illustrating the procedure for attaching the gasket with use of the push rivets.
Figure 5C:
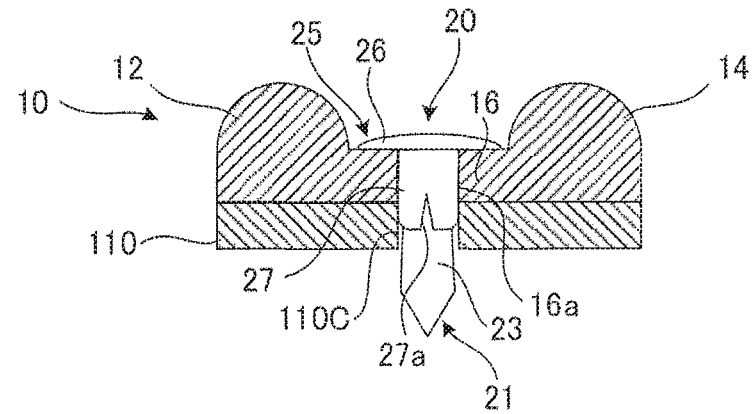
FIG. 5C is still another view illustrating the procedure for attaching the gasket with use of the push rivets.

Next, a procedure for attaching the gasket 10 illustrated in FIG. 3 and FIG. 4 to the furnace body 110 is described. FIG. 5A, FIG. 5B, and FIG. 5C are views illustrating the procedure for attaching the gasket 10 with use of the push rivets. FIG. 5A to FIG. 5C illustrate a part of the furnace body 110, where holes 110C that allow the push rivets to be inserted thereinto are provided at corresponding parts of the furnace body 110. As illustrated in FIG. 5A, a push rivet 20 includes a pin 21 and a rivet body 25. The pin 21 includes a head portion 22 and a shaft portion 23. The shaft portion 23 includes a tapered part such that a diameter of the shaft portion 23 gradually increases toward a distal end of the pin 21. The rivet body 25 includes a flange portion 26 and a leg portion 27 extending from the flange portion 26. The flange portion 26 has a hole that allows the pin 21 to be inserted thereinto, and the leg portion 27 is formed into a substantially cylindrical shape so as to allow the pin 21 to be inserted thereinto. The leg portion 27 includes notch portions 27a at an end portion on the distal end side of the pin 21.

The gasket 10 is attached to the furnace body 110 as follows. First, the gasket 10 is arranged in the furnace body 110, and as illustrated in FIG. 5A, the push rivet 20 is inserted into the through-hole 16a of the gasket 10 and the hole 110C of the furnace body 110. Under the state illustrated in FIG. 5A, the gasket 10 has not yet been fixed to the furnace body 110, Then, as illustrated in FIG. 5B, an operator or the like pushes the head portion 22 of the pin 21 into the rivet body 25. At this time, the shaft portion 23 of the pin 21 causes the leg portion 27 of the rivet body 25 to radially expand. With this, the leg portion 27 of the rivet body 25 is pressed against an inner peripheral surface of the hole 110C of the furnace body 110. In this way, the push rivet 20 is fixed to the furnace body 110. The gasket 10 is pressed against the furnace body 110 by the flange portion 26 of the rivet body 25. In this way, the gasket 10 is fixed to the furnace body 110 by the push rivet 20.

In order to detach the gasket 10 from the furnace body 110, as illustrated in FIG. 5C, the pin 21 of the push rivet 20 is further pushed in toward the distal end. As a result, a relatively radially-small part of the pin 21 comes to an inside of the rivet body 25. With this, the leg portion 27 of the rivet body 25 is radially shrunk (enters a straight state). In this state, the push rivet 20 is pulled out of the through-hole 16a of the gasket 10 and the hole 110C of the furnace body 110. In this way, the fixation of the gasket 10 is released.

As described hereinabove, in the reflow apparatus 100 according to this embodiment, the gasket 10 is fixed in the attachable/detachable manner to the furnace body 110 by the push rivet 20. The push rivet 20 can be easily attached and detached by the operator, and hence the gasket 10 can be easily attached to and detached from the furnace body 110. Further, in this embodiment, by inserting the push rivet 20 into the through-hole 16a of the gasket 10, the flange portion 26 is brought into direct contact with the gasket 10, whereby the gasket 10 can be fixed to the furnace body 110. Still further, in this fixed state, by further pushing in the pin 21 of the push rivet 20 toward the distal end, and then by pulling the push rivet 20 out of the through-hole 16a of the gasket 10 and the hole 110C of the furnace body 110, the fixation of the gasket 10 is cancelled. With this, efficiency at the time of the operation to attach the gasket 10 and maintainability at the time of replacing the gasket 10 can be increased higher than those in the related-art fixation methods including using the screws or the bond.

There is no particular problem as long as the gasket 10 includes either one of the first sealing portion 12 and the second sealing portion 14. However, since the gasket 10 according to this embodiment includes the first sealing portion 12 and the second sealing portion 14, even when either one of the sealing portions is deteriorated, the furnace body 110 can be kept sealed by another one of the sealing portions. For example, when the gasket 10 is fixed to the furnace body 110 such that the first sealing portion 12 is close to the carry-in port 120 and the carry-out port 130, the first sealing portion 12 is directly exposed to the in-furnace air. As a result, the deterioration of the first sealing portion 12 progresses, and the sealability may be lost. In addition, the first sealing portion 12 may be physically damaged by impact at the time of opening and closing the upper furnace body 110A, and the sealability may be lost. Even when the sealability of the first sealing portion 12 is lost in such ways, the sealability can be maintained by the second sealing portion 14. Thus, the leakage of the in-furnace air can be suppressed smaller than that to be suppressed with a gasket including only one sealing portion. In addition, since the fixation portion 16 is located between the first sealing portion 12 and the second sealing portion 14, the first sealing portion 12 and the second sealing portion 14 can be relatively uniformly fixed.

Figure 6:
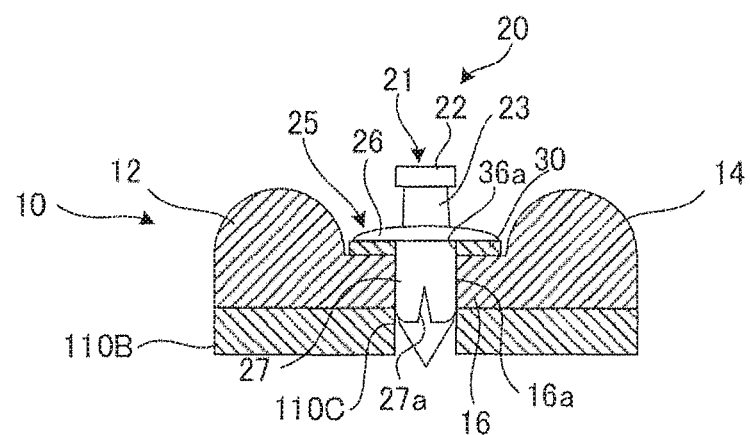
FIG. 6 is a cross-sectional view of a push rivet and a gasket that use a holding plate.

FIG. 6 is a cross-sectional view of a push rivet and a gasket that use a holding plate. The gasket 10, which is attached to the lower furnace body 110B in the example illustrated in FIG. 6 for the sake of convenience of description, may be attached to the upper furnace body 110A. As illustrated in FIG. 6, in this embodiment, although not being an essential component in the present invention, a holding plate 30 to be fixed by the push rivet 20 while in contact with the fixation portion 16 is interposed between the push rivet 20 and the gasket 10. The holding plate 30 is a long plate that extends in the longitudinal direction and covers a part corresponding to the fixation portion 16 located between the first sealing portion 12 and the second sealing portion 14. A plurality of through-holes 36a are formed substantially at a central portion in its transverse direction at an interval similar to that of the through-holes 16a. The holding plate 30 is placed on the fixation portion 16 with the through-holes 16a and the through-holes 36a aligned with each other. By inserting the push rivets 20 into the through-holes 16a, the push rivets 20 pass through the through-holes 36a, and then also through the through-holes 16a. Then, by pushing the head portion 22 of the pin 21 into the rivet body 25, the holding plate 30 is fixed to the fixation portion 16 in contact therewith by the push rivet 20. By providing the holding plate 30 in such a way, in the gasket 10, pressure to be applied from the push rivets 20 only to peripheries of the through-holes 16a can be distributed to an entirety of the fixation portion 16 via the holding plate 30. With this, strength to fix the gasket 10 to the furnace body 110 (lower furnace body 110B or upper furnace body 110A) can be increased.

Incidentally, in the example illustrated in FIG. 6, if the flux fumes enter and adhere to the upper furnace body 110A (not shown in FIG. 6) held in intimate contact with the first sealing portion 12 and the second sealing portion 14, the flux fumes may be cooled and cured after the reflow apparatus 100 is stopped. As a result, the first sealing portion 12 or the second sealing portion 14 and the upper furnace body 110A to which the gasket 10 is not attached may be bonded to each other. In this case, when the upper furnace body 110A is opened, the gasket 10 may be peeled off from the lower furnace body 110B, specifically, from the bonded part. However, by providing the holding plate 30 as illustrated in FIG. 6 such that the strength to fix the gasket 10 to the lower furnace body 110B is increased, even when the phenomenon that the first sealing portion 12 or the second sealing portion 14 and the upper furnace body 110A are bonded to each other has occurred, the gasket 10 can be suppressed from being peeled off from the lower furnace body 110B. In this embodiment, the holding plate 30 is a single plate that covers an entirety of the fixation portion 16. However, the present invention is not limited to this embodiment. For example, the holding plate 30 may be divided into a plurality of holding plates 30, and then discontinuously placed or superimposed on each other on the fixation portion 16. Although a material of the holding plate 30 is not particularly limited, undeformable metals or resins are desired.

Further, although the upper furnace body 110A is openable/closable on its one side relative to the lower furnace body 110B in the above-described configuration of the reflow apparatus 100, the present invention is not limited to this configuration. For example, the configuration of the present invention is applicable, for example, also to a soldering apparatus as disclosed in PCT Application WO 2018/225437, in which the upper furnace body 110A is opened and closed upward and downward by raising/lowering means. Still further, the present invention is applicable also to a soldering apparatus including two or more transport conveyors.

The embodiment of the present invention is described hereinabove merely for the sake of better understanding of the present invention, and hence is not intended to limit the present invention. As a matter of course, the present invention may be varied and modified within the gist thereof, and may encompass equivalents thereof. In addition, as long as at least some of the above-described problems can be solved, or as long as at least some of the above-described advantages can be obtained, the components described in claims and described herein may be arbitrarily omitted or combined with each other.

Hereinbelow, some other embodiments disclosed herein are described.

According to a first aspect, there is provided a soldering apparatus. This soldering apparatus includes:

a furnace body;

a gasket that is provided to at least a part of the furnace body, and that seals the furnace body; and a push rivet that fixes the gasket in an attachable/detachable manner to the furnace body.

According to the first aspect, the gasket is fixed with the push rivet. The push rivet can be easily attached and detached by an operator, and hence the gasket can be easily attached and detached.

According to a second aspect, in the soldering apparatus of the first aspect, the gasket includes a first sealing portion, a fixation portion coupled to the first sealing portion, and a through-hole formed through the fixation portion, and the push rivet is inserted into the through-hole.

According to a third aspect, in the soldering apparatus of the second aspect, the gasket further includes a second sealing portion coupled to the fixation portion, and the fixation portion is located between the first sealing portion and the second sealing portion.

According to the third aspect, the gasket includes not only the first sealing portion but also the second sealing portion. Thus, even when either one of the sealing portions is deteriorated, the furnace body can be kept sealed by another one of the sealing portions. In addition, since the fixation portion is located between the first sealing portion and the second sealing portion, the first sealing portion and the second sealing portion can be relatively uniformly fixed to the furnace body.

According to a fourth aspect, in the soldering apparatus of the third aspect, the first sealing portion and the second sealing portion each have substantially a same thickness.

According to the fourth aspect, pressure is relatively uniformly applied to the first sealing portion and the second sealing portion under a state in which the furnace body is sealed by the gasket. As a result, degrees of deterioration of the first sealing portion and the second sealing portion can be further equalized to each other.

According to a fifth aspect, in the soldering apparatus of any of the second aspect to the fourth aspect, the fixation portion is thinner than the first sealing portion.

According to the fifth aspect, the push rivet is arranged at the fixation portion thinner than the first sealing portion. This arrangement enables the push rivet not to physically hinder the sealing at the time when the furnace body is sealed by the gasket.

According to a sixth aspect, the soldering apparatus of the fifth aspect further includes:

a holding plate that is fixed between the gasket and the push rivet by the push rivet while in contact with the fixation portion.

According to the sixth aspect, in the gasket, pressure applied only to a periphery of the through-hole that allows the push rivet to be inserted thereinto is distributed to an entirety of the gasket via the holding plate. With this, strength to fix the gasket to the furnace body can be increased. As a result, the gasket can be suppressed from peeling from the furnace body.

According to a seventh aspect, there is provided a method of fixing a gasket to a soldering apparatus. This method includes:

arranging the gasket in a furnace body of the soldering apparatus; and fixing the gasket in an attachable/detachable manner to the furnace body with use of a push rivet.

According to the seventh aspect, the gasket is fixed with the push rivet. The push rivet can be easily attached and detached by an operator, and hence the gasket can be easily attached and detached.

According to an eighth aspect, in the method of the seventh aspect, the fixing of the gasket includes inserting the push rivet into a through-hole formed through a fixation portion coupled to a first sealing portion of the gasket.

According to a ninth aspect, in the method of the eighth aspect, the fixing of the gasket includes inserting the push rivet into the through-hole formed through the fixation portion located between the first sealing portion and a second sealing portion of the gasket.

According to the ninth aspect, the gasket includes not only the first sealing portion but also the second sealing portion. Thus, even when either one of the sealing portions is deteriorated, the furnace body can be kept sealed by another one of the sealing portions. In addition, since the fixation portion is located between the first sealing portion and the second sealing portion, the first sealing portion and the second sealing portion can be relatively uniformly fixed to the furnace body.

REFERENCE SIGNS LIST 10 gasket
12 first sealing portion
14 second sealing portion
16 fixation portion
16a through-hole
20 push rivet
100 reflow apparatus
110 furnace body

What is claimed is:

1. A soldering apparatus, comprising:
a furnace body including an upper furnace body and a lower furnace body;
a gasket
that is provided to at least a part of the upper furnace body or of the lower furnace body, and
that is positioned between the upper furnace body and the lower furnace body and provides a seal extending between the upper furnace body and the lower furnace body;
a push rivet that fixes the gasket in an attachable/detachable manner to the part of the upper furnace body or of the lower furnace body;
a carry-in port through which boards are carried into the furnace body; and
a carry-out port through which boards are carried out from the furnace body;
wherein
the push rivet includes a rivet body and a pin,
the rivet body includes a flange portion and a leg portion extending from the flange portion,
the flange portion and the leg portion are shaped to receive the pin inserted therein,
the gasket has an elongated shape that extends longitudinally in a direction that is aligned with a board transport direction through the furnace body, and
the gasket extends along a direction in which the carry-in port and the carry-out port are connected to each other.

2. The soldering apparatus according to claim 1,
wherein the gasket includes
a first sealing portion,
a fixation portion coupled to the first sealing portion, and
a through-hole formed through the fixation portion, and
wherein the push rivet is inserted into the through-hole.

3. The soldering apparatus according to claim 2,
wherein the gasket further includes a second sealing portion coupled to the fixation portion, and
wherein the fixation portion is located between the first sealing portion and the second sealing portion.

4. The soldering apparatus according to claim 3,
wherein the first sealing portion and the second sealing portion each have substantially a same thickness.

5. The soldering apparatus according to claim 2,
wherein the fixation portion is thinner than the first sealing portion.

6. The soldering apparatus according to claim 5, further comprising
a holding plate that is fixed between the gasket and the push rivet by the push rivet while in contact with the fixation portion.

7. A method of fixing a gasket to a soldering apparatus, the method comprising:
arranging the gasket in an upper furnace body or a lower furnace body of the soldering apparatus;
fixing the gasket in an attachable/detachable manner to the upper furnace body or the lower furnace body with use of a push rivet with the gasket having an elongated shape that extends longitudinally in a direction that is aligned with a board transport direction through the furnace body, and
sealing between the upper furnace body and the lower furnace body with use of the gasket positioned between the upper furnace body and the lower furnace body and extending between the upper furnace body and the lower furnace body, wherein
the push rivet includes a rivet body and a pin, and the rivet body includes a flange portion and a leg portion extending from the flange portion,
the fixing with use of the push rivet comprises inserting the pin into the flange portion and the leg portion,
the soldering apparatus comprises a carry-in port through which the boards are carried into a furnace body including the upper furnace body and the lower furnace body, and a carry-out port through which the boards are carried out from the furnace body, and
the gasket extends along a direction in which the carry-in port and the carry-out port are connected to each other.

8. The method of fixing the gasket to the soldering apparatus according to claim 7,
wherein the fixing of the gasket includes inserting the push rivet into a through-hole formed through a fixation portion coupled to a first sealing portion of the gasket.

9. The method of fixing the gasket to the soldering apparatus according to claim 8,
wherein the fixing of the gasket includes inserting the push rivet into the through-hole formed through the fixation portion located between the first sealing portion and a second sealing portion of the gasket.

10. The soldering apparatus according to claim 2,
wherein the gasket further includes a second sealing portion coupled to the fixation portion,
wherein the fixation portion is located between the first sealing portion and the second sealing portion, and
wherein the fixation portion is thinner than the first sealing portion.

11. The soldering apparatus according to claim 2,
wherein the gasket further includes a second sealing portion coupled to the fixation portion,
wherein the fixation portion is located between the first sealing portion and the second sealing portion, and
wherein the fixation portion is thinner than the second sealing portion.

12. The soldering apparatus according to claim 3,
wherein the first sealing portion and the second sealing portion each have substantially a same thickness, and
wherein the fixation portion is thinner than each of the first sealing portion and the second sealing portion.

13. The soldering apparatus according to claim 1,
wherein the leg portion comprises a notch extending along an insertion direction of the pin.

14. The soldering apparatus according to claim 1,
wherein the leg portion has a tubular shape, and the pin has an outer diameter larger than an inner diameter of the leg portion.

15. The method of fixing the gasket to the soldering apparatus according to claim 7, further comprising causing the leg portion to radially expand by inserting the pin into the leg portion.

* * * * *